United States Patent
Otsuka et al.

(10) Patent No.: US 10,913,102 B2
(45) Date of Patent: Feb. 9, 2021

(54) DRAWN BODY FOR VEHICLE STRUCTURAL MEMBER, MANUFACTURING METHOD FOR DRAWN BODY FOR VEHICLE STRUCTURAL MEMBER, AND MANUFACTURING APPARATUS FOR DRAWN BODY FOR VEHICLE STRUCTURAL MEMBER

(71) Applicant: NIPPON STEEL & SUMITOMO METAL CORPORATION, Tokyo (JP)

(72) Inventors: Kenichiro Otsuka, Tokyo (JP); Takashi Miyagi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 45 days.

(21) Appl. No.: 16/308,970

(22) PCT Filed: Jun. 16, 2017

(86) PCT No.: PCT/JP2017/022346
§ 371 (c)(1),
(2) Date: Dec. 11, 2018

(87) PCT Pub. No.: WO2017/217538
PCT Pub. Date: Dec. 21, 2017

(65) Prior Publication Data
US 2019/0176211 A1   Jun. 13, 2019

(30) Foreign Application Priority Data
Jun. 16, 2016 (JP) ................. 2016-120157

(51) Int. Cl.
*B21D 47/01* (2006.01)
*B62D 25/04* (2006.01)
(Continued)

(52) U.S. Cl.
CPC ............ *B21D 47/01* (2013.01); *B21D 22/02* (2013.01); *B21D 22/26* (2013.01); *B21D 24/00* (2013.01);
(Continued)

(58) Field of Classification Search
CPC ........ B21D 47/01; B21D 22/26; B21D 24/00; B21D 22/02; B62D 29/007; B62D 25/025
(Continued)

(56) References Cited

U.S. PATENT DOCUMENTS

2005/0087271 A1    4/2005  Gejima et al.
2011/0241386 A1   10/2011  Mildner et al.
2017/0291208 A1*  10/2017  Nishimura ............. B21D 24/06

FOREIGN PATENT DOCUMENTS

| CN | 1589989 A | 3/2005 |
|---|---|---|
| EP | 3031545 A1 | 6/2016 |
| JP | 2002-102980 A | 4/2002 |
| JP | 2004-181502 A | 7/2004 |
| JP | 2007-190588 A | 8/2007 |
| JP | 2011-98370 A | 5/2011 |
| JP | 2011-245502 A | 12/2011 |
| RU | 2548203 C2 | 4/2015 |

(Continued)

OTHER PUBLICATIONS

Russian Decision to Grant and Search Report, dated Sep. 10, 2019, for corresponding Russian Application No. 2018145012, with an English translation of the Russian Decision to Grant.

(Continued)

*Primary Examiner* — Dennis H Pedder
(74) *Attorney, Agent, or Firm* — Birch, Stewart, Kolasch & Birch, LLP

(57) ABSTRACT

A drawn body for a vehicle structural member has a tensile strength of 980 MPa or more, radii of curvature of two first convex ridge portions, a second convex ridge portion, and a concave ridge portion are each 30 mm or less, a corner radius of a corner wall is 30 mm or less, and a forming depth which is a separation distance between a top sheet portion and an outwardly-extending flange is 40 mm or more.

12 Claims, 16 Drawing Sheets

(51) Int. Cl.
| | |
|---|---|
| *B21D 22/26* | (2006.01) |
| *B62D 25/00* | (2006.01) |
| *B21D 24/00* | (2006.01) |
| *B62D 25/20* | (2006.01) |
| *B62D 21/00* | (2006.01) |
| *B62D 29/00* | (2006.01) |
| *B60R 19/04* | (2006.01) |
| *B21D 22/02* | (2006.01) |
| *B21D 53/88* | (2006.01) |
| *B60R 19/18* | (2006.01) |
| *B62D 25/02* | (2006.01) |

(52) U.S. Cl.
CPC .............. *B21D 53/88* (2013.01); *B60R 19/04* (2013.01); *B60R 19/18* (2013.01); *B62D 21/00* (2013.01); *B62D 25/00* (2013.01); *B62D 25/025* (2013.01); *B62D 25/04* (2013.01); *B62D 25/20* (2013.01); *B62D 29/007* (2013.01); *B60R 2019/1826* (2013.01)

(58) Field of Classification Search
USPC ............................... 296/187.01, 209, 203.03
See application file for complete search history.

(56) References Cited

FOREIGN PATENT DOCUMENTS

| WO | WO 2015/155943 A1 | 10/2015 |
| WO | WO 2015/174353 A1 | 11/2015 |
| WO | WO 2015/194401 A1 | 12/2015 |
| WO | 2016/043326 A1 | 3/2016 |
| WO | WO 2016/088519 A1 | 6/2016 |
| WO | WO 2016/104078 A1 | 6/2016 |

OTHER PUBLICATIONS

Extended European Search Report for counterpart European Application No. 17813431.8, dated Mar. 2, 2020.
Indian Office Action dated Dec. 17, 2019 for corresponding Application No. 201817046136, with an English translation.
Japanese Notice of Allowance and English translation for counterpart Japanese Application No. 2018-524040, dated Mar. 3, 2020.
Korean Office Action and English translation for counterpart Korean Application No. 10-2018-7036510 dated Feb. 17, 2020.
International Search Report for PCT/JP2017/022346 dated Jul. 11, 2017.

\* cited by examiner

DRAWN BODY FOR VEHICLE
STRUCTURAL MEMBER,
MANUFACTURING METHOD FOR DRAWN
BODY FOR VEHICLE STRUCTURAL
MEMBER, AND MANUFACTURING
APPARATUS FOR DRAWN BODY FOR
VEHICLE STRUCTURAL MEMBER

Priority is claimed on Japanese Patent Application No. 2016-120157, filed on Jun. 16, 2016, the content of which is incorporated herein by reference.

TECHNICAL FIELD OF THE INVENTION

The present invention relates to a drawn body for a vehicle structural member, a manufacturing method for a drawn body for a vehicle structural member, and a manufacturing apparatus for a drawn body for a vehicle structural member.

RELATED ART

As a vehicle structural member, for example, a long member having a hat-shaped cross-sectional shape such as a side sill, a bumper reinforcement, a lower A pillar panel, an A pillar, and a B pillar has been widely used. As the material of such a vehicle structural member, from the viewpoint of reducing the weight of a vehicle and improving collision safety, for example, a thin high strength steel sheet having a sheet thickness of 1.4 mm or less and a tensile strength of 980 MPa or more is used.

On the other hand, a reduction in the bending rigidity or torsional rigidity (hereinafter, collectively referred to as "rigidity") of a vehicle body (body shell) is a problem due to thinning of the vehicle structural member. Therefore, there is a strong demand for the improvement in the rigidity of the vehicle structural member obtained by press-working the thin high strength steel sheet.

Since the formability of a high strength steel sheet is low, the vehicle structural member formed of the thin high strength steel sheet is generally formed by press working using bending forming. However, when the long vehicle structural member described above is formed by the press working using the bending forming, shrinkage occurs during the bending forming and wrinkles tend to be generated in a flange formed portion.

Therefore, the vehicle structural member cannot have a structure having an end wall at an end portion in a longitudinal direction thereof (a structure having a U-shaped or rectangular cross-sectional shape perpendicular to a pressing direction). Therefore, the vehicle structural member has to have a hat-shaped open cross-sectional shape constituted by a top sheet portion, side walls adjacent to both sides of the top sheet portion, and a flange adjacent to the side walls.

The rigidity of the vehicle structural member having the hat-shaped open cross-sectional shape is lower than the rigidity of a vehicle structural member having a U-shaped cross-sectional shape or a rectangular cross-sectional shape. Even if the vehicle structural member having the U-shaped cross-sectional shape or the rectangular cross-sectional shape can be formed, a forming depth has to be small in order to avoid the generation of wrinkles particularly in the end wall or the side wall. Therefore, a vehicle structural member having high rigidity cannot be obtained.

As described above, when the vehicle structural member is to be manufactured using a thin high strength steel sheet having a tensile strength of, for example, 980 MPa or more as the material, due to two points of a thin sheet thickness and a small forming depth, a vehicle structural member having high rigidity cannot be manufactured.

Patent Document 1 discloses a press working method excellent in shape fixability in which, when press working for forming a metal sheet into a hat-shaped cross-sectional shape is performed using a processing tool provided with a punch, a die, and a wrinkle suppression, in a state where both end portions of the metal sheet in a width direction thereof is sandwiched and pressed between the die and the wrinkle suppression, first, using the punch having, at its head portion, a convex portion with a semicircular cross-sectional shape which is convex toward the metal sheet, the convex portion of the punch is brought into contact with a metal sheet portion which is to become a wall portion having the hat-shaped cross-sectional shape, preliminary work for forming a portion which is to become a hat head portion of the metal sheet into a convex shape which is convex toward the outside is performed on the metal sheet, and next, using a punch for obtaining a predetermined hat-shaped cross-sectional shape, the metal sheet after the preliminary work is subjected to finish work.

Patent Document 2 discloses a method for manufacturing a polygonal annular member from a flat metal sheet by press working, including a step of forming a side circumferential portion including a flat surface portion, a corner portion formed of a curved surface, and a deformed portion in a boundary region between the corner portion and the flat surface portion through drawing, a step of forming the side circumferential portion into a predetermined height from the metal flat sheet surface, and a step of forming an edge portion having a smaller radius of curvature than a radius of curvature of the corner portion from the corner portion in an inner circumferential surface of the annular member by extruding the corner portion from inside of the annular member over the height of the side circumferential portion and supplying a metal material forming the deformed portion to the edge portion.

PRIOR ART DOCUMENT

Patent Document

[Patent Document 1] Japanese Unexamined Patent Application, First Publication No. 2004-181502
[Patent Document 2] Japanese Unexamined Patent Application, First Publication No. 2011-245502

DISCLOSURE OF THE INVENTION

Problems to be Solved by the Invention

In the invention disclosed by Patent Document 1, since a top sheet portion of a formed body formed by the preliminary work is crushed by the finish work, a radius of curvature of a bent portion in a cross-sectional view can be reduced. However, a corner radius in a plan view cannot be reduced.

In the invention disclosed by Patent Document 2, since a tool for pressing the corner portion from inside is used in the step of forming the edge portion, there is a need to modify the facility such as a die and punch, and the content of modification is complex, resulting in facility costs.

The present invention has been made taking the foregoing circumstances into consideration, and an object thereof is to provide a drawn body for a vehicle structural member, a manufacturing method for a drawn body for a vehicle structural member, and a manufacturing apparatus for a drawn body for a vehicle structural member capable of increasing collision resistance by achieving high rigidity while realizing a reduction in weight.

Means for Solving the Problem

The present invention is as described below.

(1) A first aspect of the present invention is a drawn body for a vehicle structural member, the drawn body having a tensile strength of 980 MPa or more, the drawn body including: a top sheet portion extending in a first direction; two first convex ridge portions adjacent to both sides of the top sheet portion in a second direction which is perpendicular to the first direction and along the top sheet portion; a second convex ridge portion which is adjacent to an endmost portion of the top sheet portion in the first direction and is connected to the two first convex ridge portions; two side walls adjacent to the two first convex ridge portions; an end wall adjacent to the second convex ridge portion; two corner walls which are adjacent to the two side walls and the end wall and have a curved shape as viewed in a direction perpendicular to the first direction and the second direction; a concave ridge portion adjacent to the two side walls, the end wall, and the two corner walls; and an outwardly-extending flange adjacent to the concave ridge portion.

A radius of curvature of a cross section perpendicular to an extension direction of each of the two first convex ridge portions, the second convex ridge portion, and the concave ridge portion is 30 mm or less, a corner radius which is a radius of curvature of the corner wall viewed in the direction perpendicular to the first direction and the second direction at a position spaced by 1.0 mm from a boundary between the outwardly-extending flange and the concave ridge portion along the corner wall is 30 mm or less, and a forming depth which is a separation distance between the top sheet portion and the outwardly-extending flange in a direction perpendicular to the top sheet portion is 40 mm or more.

(2) In the drawn body for a vehicle structural member according to (1), the end wall, the two corner walls, the concave ridge portion, and the outwardly-extending flange may be formed at both ends in the first direction.

(3) In the drawn body for a vehicle structural member according to (1) or (2), the drawn body may be any one of the group consisting of a side sill, a bumper beam, a lower A pillar panel, an A pillar, and a B pillar.

(4) A second aspect of the present invention is a manufacturing method for the drawn body for a vehicle structural member according to any one of (1) to (3), the manufacturing method including: a first step of performing press working on a blank having a tensile strength of 980 MPa or more by drawing using a first die, a first punch, and a first blank holder, thereby forming a first intermediate drawn body which includes an intermediate top sheet portion extending in the first direction, two intermediate first convex ridge portions adjacent to both sides of the intermediate top sheet portion in the second direction perpendicular to the first direction, an intermediate second convex ridge portion which is adjacent to an endmost portion of the intermediate top sheet portion in the first direction and is connected to the two intermediate first convex ridge portions, two intermediate side walls connected to the two intermediate first convex ridge portions, an intermediate end wall adjacent to the intermediate second convex ridge portion, two intermediate corner walls which are adjacent to the two intermediate side walls and the intermediate end wall and have a curved shape as viewed in the direction perpendicular to the first direction and the second direction, an intermediate concave ridge portion adjacent to the two intermediate side walls, the intermediate end wall, and the two intermediate corner walls, and an intermediate outwardly-extending flange adjacent to the intermediate concave ridge portion, in which a radius of curvature of a cross section perpendicular to an extension direction of each of the two intermediate first convex ridge portions, the intermediate second convex ridge portion, and the intermediate concave ridge portion is greater than the radius of curvature of the cross section perpendicular to the extension direction of each of the two first convex ridge portions, the second convex ridge portion, and the concave ridge portion of the drawn body, an intermediate corner radius, which is a radius of curvature of the intermediate corner wall viewed in the direction perpendicular to the first direction and the second direction at a position spaced by 1.0 mm from a boundary between the intermediate outwardly-extending flange and the intermediate concave ridge portion along the intermediate corner wall, is greater than the corner radius of the corner wall of the drawn body, and an intermediate forming depth, which is a separation distance between the intermediate top sheet portion and the intermediate outwardly-extending flange in a direction perpendicular to the intermediate top sheet portion, is greater than the forming depth of the drawn body; a second step of performing press working on the first intermediate drawn body by drawing using a second die, a second punch, and a second blank holder to reduce the radius of curvature of the cross section perpendicular to the extension direction of each of the two intermediate first convex ridge portion, the intermediate second convex ridge portion, and the intermediate concave ridge portion and the intermediate forming depth, thereby forming a second intermediate drawn body which has the radius of curvature of the cross section perpendicular to the extension direction of each of the two first convex ridge portions, the second convex ridge portion, and the concave ridge portion of the drawn body and the forming depth; and a third step of pressing the intermediate end wall of the second intermediate drawn body in the first direction by a tightening tool while pressing an inner surface of the intermediate end wall of the first intermediate drawn body by an inner pad embedded in the second punch in a state in which the second intermediate drawn body is confined by the second die, the second punch, and the second blank holder, thereby reducing the intermediate corner radius of the intermediate corner wall.

(5) In the manufacturing method for the drawn body for a vehicle structural member according to (4), the intermediate forming depth may be 1.1 to 2.0 times the forming depth, the radii of curvature of the two intermediate first convex ridge portion, the intermediate second convex ridge portion, and the intermediate concave ridge portion may be 1.2 to 30 times the radii of curvature of the two first convex ridge portions, the second convex ridge portion, and the concave ridge portion, respectively, and the intermediate corner radius may be 1.2 to 30 times the corner radius.

(6) In the manufacturing method for the drawn body for a vehicle structural member according to (4) or (5), the tightening tool may be disposed so as to be movable in the first direction on the outside of the second die.

(7) In the manufacturing method for the drawn body for a vehicle structural member according to (4) or (5), the tightening tool may be disposed so as to be movable in the first direction from the outside to the inside of the second die.

(8) A third aspect of the present invention is a manufacturing apparatus for the drawn body for a vehicle structural member according to any one of (1) to (3), the manufacturing apparatus including: a first forming die having a first die, a first punch, and a first blank holder; a second forming die having a second die, a second punch, and a second blank holder; and a tightening tool, in which the first forming die performs press working on a blank having a tensile strength of 980 MPa or more by drawing, thereby forming a first intermediate drawn body which includes an intermediate top sheet portion extending in the first direction, two intermediate first convex ridge portions adjacent to both sides of the intermediate top sheet portion in the second direction perpendicular to the first direction, an intermediate second convex ridge portion which is adjacent to an endmost portion of the intermediate top sheet portion in the first direction and is connected to the two intermediate first convex ridge portions, two intermediate side walls connected to the two intermediate first convex ridge portions, an intermediate end wall adjacent to the intermediate second convex ridge portion, two intermediate corner walls which are adjacent to the two intermediate side walls and the intermediate end wall and have a curved shape as viewed in the direction perpendicular to the first direction and the second direction, an intermediate concave ridge portion adjacent to the two intermediate side walls, the intermediate end wall, and the two intermediate corner walls, and an intermediate outwardly-extending flange adjacent to the intermediate concave ridge portion, in which a radius of curvature of a cross section perpendicular to an extension direction of each of the two intermediate first convex ridge portions, the intermediate second convex ridge portion, and the intermediate concave ridge portion is greater than the radius of curvature of the cross section perpendicular to the extension direction of each of the two first convex ridge portions, the second convex ridge portion, and the concave ridge portion of the drawn body, an intermediate corner radius, which is a radius of curvature of the intermediate corner wall viewed in the direction perpendicular to the first direction and the second direction at a position spaced by 1.0 mm from a boundary between the intermediate outwardly-extending flange and the intermediate concave ridge portion along the intermediate corner wall, is greater than the corner radius of the corner wall of the drawn body, and an intermediate forming depth, which is a separation distance between the intermediate top sheet portion and the intermediate outwardly-extending flange in a direction perpendicular to the intermediate top sheet portion, is greater than the forming depth of the drawn body, the second forming die performs press forming on the first intermediate drawn body by drawing to reduce the radius of curvature of the cross section perpendicular to the extension direction of each of the two intermediate first convex ridge portion, the intermediate second convex ridge portion, and the intermediate concave ridge portion and the intermediate forming depth, thereby forming a second intermediate drawn body which has the radius of curvature of the cross section perpendicular to the extension direction of each of the two first convex ridge portions, the second convex ridge portion, and the concave ridge portion of the drawn body and the forming depth, and the tightening tool presses the intermediate end wall of the second intermediate drawn body in the first direction while pressing an inner surface of the intermediate end wall of the first intermediate drawn body by an inner pad embedded in the second punch in a state in which the second intermediate drawn body is confined by the second forming die, thereby reducing the intermediate corner radius of the intermediate corner wall.

(9) In the manufacturing apparatus for the drawn body for a vehicle structural member according to (8), the intermediate forming depth may be 1.1 to 2.0 times the forming depth, the radii of curvature of the two intermediate first convex ridge portion, the intermediate second convex ridge portion, and the intermediate concave ridge portion may be 1.2 to 30 times the radii of curvature of the two first convex ridge portions, the second convex ridge portion, and the concave ridge portion, respectively, and the intermediate corner radius may be 1.2 to 30 times the corner radius.

(10) In the manufacturing apparatus for the drawn body for a vehicle structural member according to (8) or (9), the tightening tool may be disposed so as to be movable in the first direction on the outside of the second die.

(11) In the manufacturing apparatus for the drawn body for a vehicle structural member according to (8) or (9), the tightening tool may be disposed so as to be movable in the first direction from the outside to the inside of the second die.

Effects of the Invention

According to each of the aspects, since the tensile strength is 980 MPa or more, the forming depth is large, the radius of curvature of the ridge portion and the corner radius of the corner wall are small, and the end wall is provided in the end portion in the longitudinal direction, it is possible to provide the drawn body for a vehicle structural member capable of increasing collision resistance by achieving high rigidity while realizing a reduction in weight.

EMBODIMENTS OF THE INVENTION

As a result of intensive studies in order to solve the above problems, the inventors found that it is effective to adopt the following steps (a) to (c) in order to manufacture a drawn body having a tensile strength of 980 MPa or more, a target radius of curvature for a ridge portion, a target corner radius for a corner wall, and a target forming depth, and further studied and completed the present invention.

(a) Using a first forming die, a first intermediate drawn body in which the radius of curvature of a ridge portion and the corner radius of each wall are greater than target values is formed.

(b) Using a second forming die, the first intermediate drawn body is formed into a second intermediate drawn body having a cross-sectional shape having a target radius of curvature for the ridge portion and a target forming depth.

(c) Using a tightening tool such as a cam, an end portion of the second intermediate drawn body in a longitudinal direction thereof is pressed in an axial direction of the second intermediate drawn body to make the corner radius of the corner wall small.

Hereinafter, embodiments of the present invention based on the above-described findings will be described with reference to the drawings.

(1. Drawn Body 1 for Vehicle Structural Member According to Embodiment of Present Invention)

Figure 1:
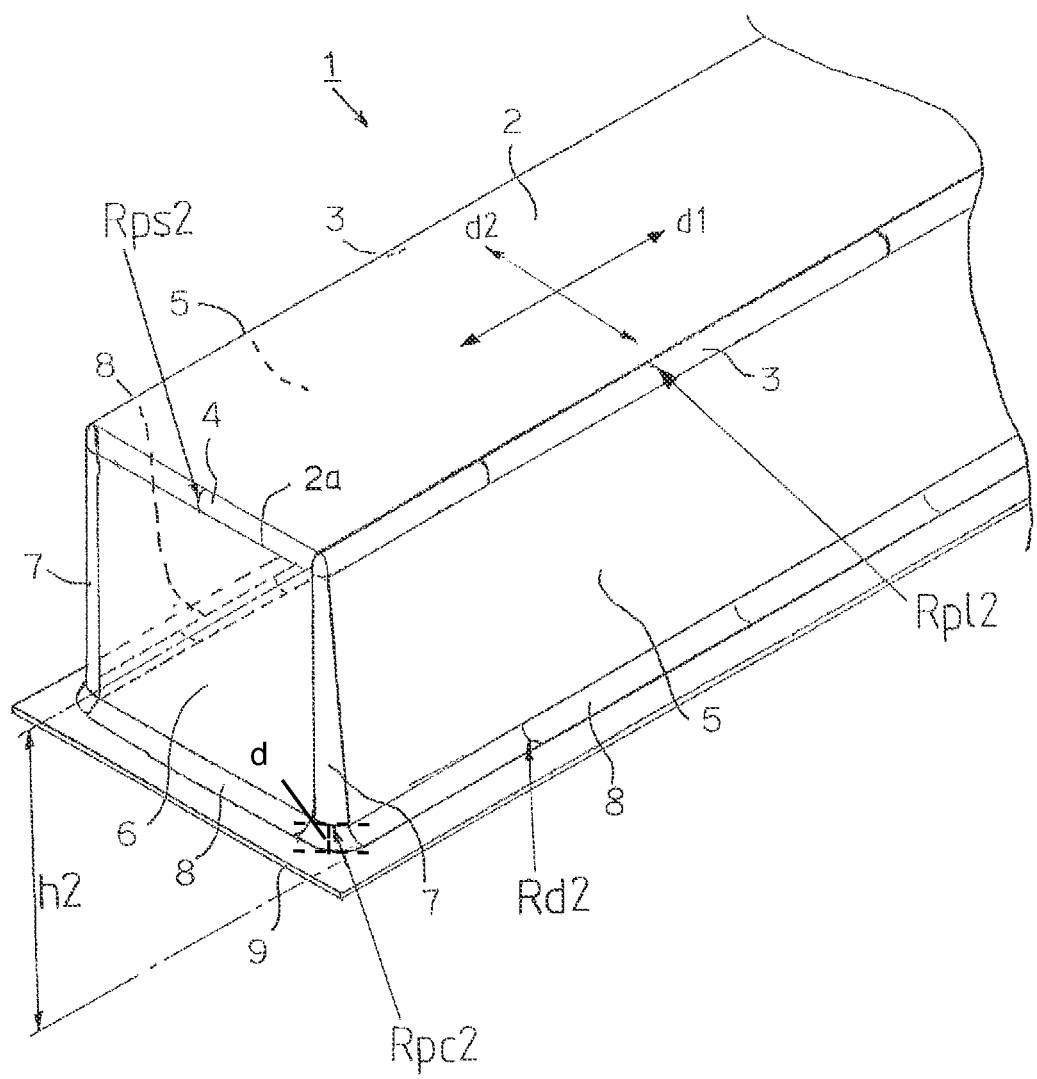
FIG. 1 is an explanatory view schematically showing a portion of a drawn body for a vehicle structural member according to an embodiment of the present invention.

FIG. 1 is an explanatory view schematically showing a portion of a structure of a drawn body 1 for a vehicle structural member (hereinafter, simply referred to as "drawn body 1") according to an embodiment.

The drawn body 1 is a cold or warm drawn body formed of a high tensile strength steel sheet having a sheet thickness of 0.7 to 3.2 mm and a tensile strength of 980 MPa or more.

The sheet thickness is preferably 0.8 to 1.8 mm, and more preferably 0.8 to 1.4 mm.

The tensile strength is preferably 1180 MPa or more, and more preferably 1310 MPa or more.

The upper limit of the tensile strength of the high tensile strength steel sheet is preferably 1800 MPa in order to secure practicality.

As shown in FIG. 1, the drawn body 1 includes a top sheet portion 2, first convex ridge portions 3, a second convex ridge portion 4, side walls 5, an end wall 6, corner walls 7, a concave ridge portion 8, and an outwardly-extending flange 9.

The top sheet portion 2 has a substantially planar shape and extends in a first direction d1 indicated by a double-headed arrow in FIG. 1. The top sheet portion 2 is not necessarily planar but may be curved. The two first convex ridge portions 3 and 3 are formed continuously on both sides respectively in a second direction d2 (a direction indicated by a double-headed arrow in FIG. 1, and a direction perpendicular to the first direction d1 and along the top sheet portion 2) which is a width direction of the top sheet portion 2.

The second convex ridge portion 4 is adjacent to an endmost portion 2a of the top sheet portion 2 in the first direction d1 and is formed connected to the two first convex ridge portions 3 and 3. The two side walls 5 and 5 have a shape along a plane and are formed adjacent to the two first convex ridge portions 3 and 3, respectively. The end wall 6 has a shape along a plane and is formed adjacent to the second convex ridge portion 4.

The two corner walls 7 and 7 are formed adjacent to the two side walls 5 and 5, respectively, and to the end wall 6, and curved in a plan view (that is, when viewed in a direction perpendicular to the first direction d1 and the second direction d2). In addition, the two corner walls 7 and 7 are respectively adjacent to the boundary regions between the first convex ridge portions 3 and the second convex ridge portion 4. The concave ridge portion 8 is formed adjacent to the two side walls 5 and 5, the end wall 6, and the two corner walls 7 and 7. Furthermore, the outwardly-extending flange 9 is formed adjacent to the concave ridge portion 8.

Figure 2:
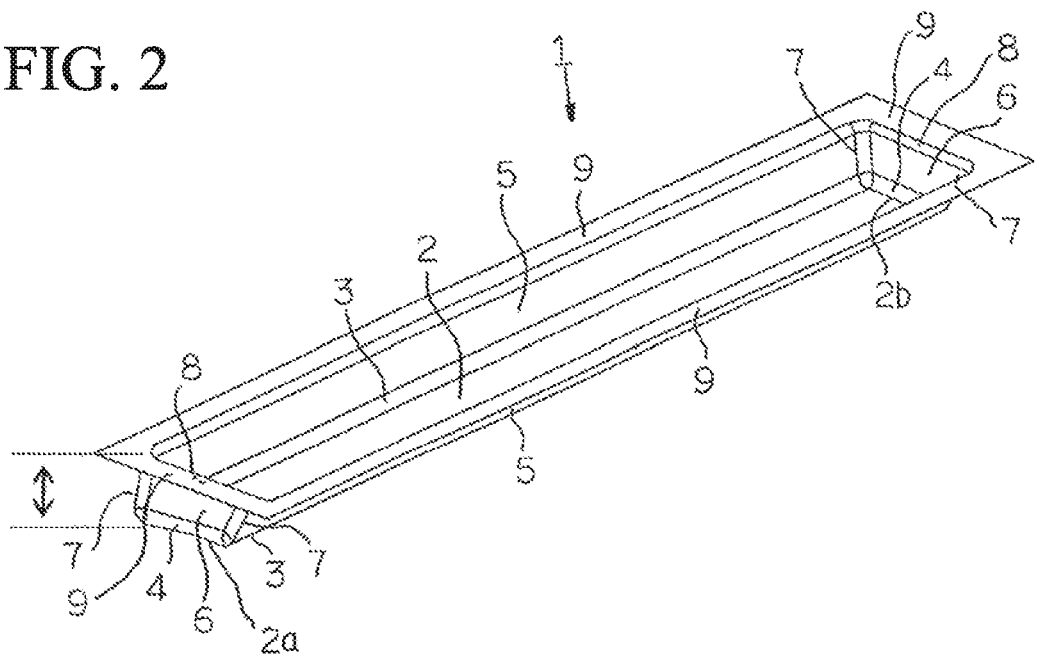
FIG. 2 is an explanatory view schematically showing the drawn body for a vehicle structural member in a case where both end portions each have an end wall.

In FIG. 1, the vicinity of the endmost portion 2a of the top sheet portion 2 in the first direction d1 is extracted and shown. However, as shown in FIG. 2, in the vicinity of another endmost portion 2b of the top sheet portion 2 in the first direction d1, the second convex ridge portion 4, the end wall 6, the corner walls 7 and 7, the concave ridge portion 8, and the outwardly-extending flange 9 may be formed. That is, the end wall 6 may be formed only at one end of the top sheet portion 2 or may be formed at both ends of the top sheet portion 2.

Although not shown, the top sheet portion 2 may have a T shape or a Y shape. In this case, the end wall may be formed at one or more end portions of the top sheet portion 2.

In the drawn body 1, a radius of curvature Rpl2 of a cross section perpendicular to the extension direction of each of the two first convex ridge portions 3 and 3, a radius of curvature Rps2 of a cross section perpendicular to the extension direction of the second convex ridge portion 4, a radius of curvature Rd2 of a cross section perpendicular to the extension direction of the concave ridge portion 8 are each 30 mm or less, whereby it is possible to obtain high bending rigidity and torsional rigidity.

The radius of curvature Rpl2, the radius of curvature Rps2, and the radius of curvature Rd2 are each preferably 20 mm or less, and more preferably 10 mm or less.

In the drawn body 1, a corner radius Rpc2, which is the radius of curvature of the corner walls 7 and 7 viewed in a direction perpendicular to the first direction d1 and the second direction d2, at a position spaced by 1.0 mm (d) from the boundary between the outwardly-extending flange 9 and the concave ridge portion 8 along the corner walls 7 and 7 is 30 mm or less, whereby it is possible to obtain high bending rigidity and torsional rigidity.

The corner radius Rpc2 is preferably 20 mm or less, and more preferably 10 mm or less.

Furthermore, a forming depth h2, which is the separation distance between the top sheet portion 2 and the outwardly-extending flange 9 in a direction perpendicular to the top sheet portion 2, is 40 mm or more, whereby it is possible to obtain high bending rigidity and torsional rigidity.

The forming depth h2 is preferably 50 mm or more, and more preferably 70 mm or more.

In the related art, in a case where a member having a tensile strength of 980 MPa or more and a U-shaped cross-sectional shape or a rectangular cross-sectional shape is to be press-formed into a forming depth of 40 mm or more, it is difficult to reduce the radius of curvature Rpl2, the radius of curvature Rps2, the radius of curvature Rd2, and the corner radius Rpc2. Even if such a member could be formed, it is difficult to exhibit high rigidity due to wrinkles generated in a side wall part and the like.

In the drawn body 1 according to the embodiment, by using a manufacturing method and a manufacturing apparatus, which will be described later, even in a case where the forming depth h2 is set to 40 mm or more, it is possible to obtain a desired radius of curvature and a corner radius while suppressing the generation of wrinkles in the end wall, the side wall, or the like.

In a case where the forming depth is 100 mm or more, it is difficult to cause the radius of curvature Rpl2, the radius of curvature Rps2, the radius of curvature Rd2, and the corner radius Rpc2 to be equal to or less than the forming depth h×0.3 mm.

By forming the end wall 6 in the endmost portion 2a in the first direction d1, the drawn body 1 has not a hat-shaped open cross-sectional shape but a U-shaped cross-sectional shape or a rectangular cross-sectional shape constituted by the end wall 6, the corner walls 7 and 7, the concave ridge portion 8, and the outwardly-extending flange 9. Therefore, it is possible to exhibit high bending rigidity and torsional rigidity while achieving a light weight. Accordingly, the drawn body 1 can exhibit high collision resistance and is thus suitably used for a vehicle structural member such as a side sill, a bumper beam, a lower A pillar panel, an A pillar, or a B pillar.

Figure 3A:
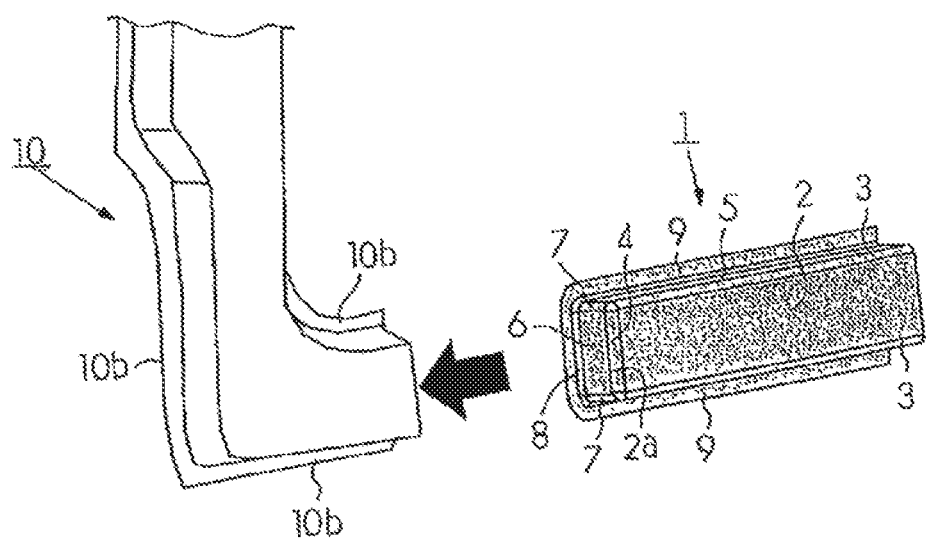
FIG. 3A is an explanatory view showing, in a case where the drawn body for a vehicle structural member according to the embodiment is used as a side sill, a state before the side sill is joined to a lower A pillar panel.
Figure 3B:
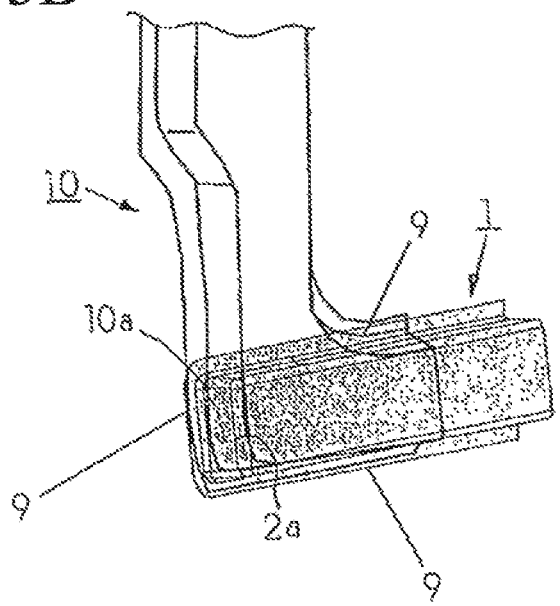
FIG. 3B is an explanatory view showing a first example of an embodiment in which the side sill is joined to the lower A pillar panel.
Figure 3C:
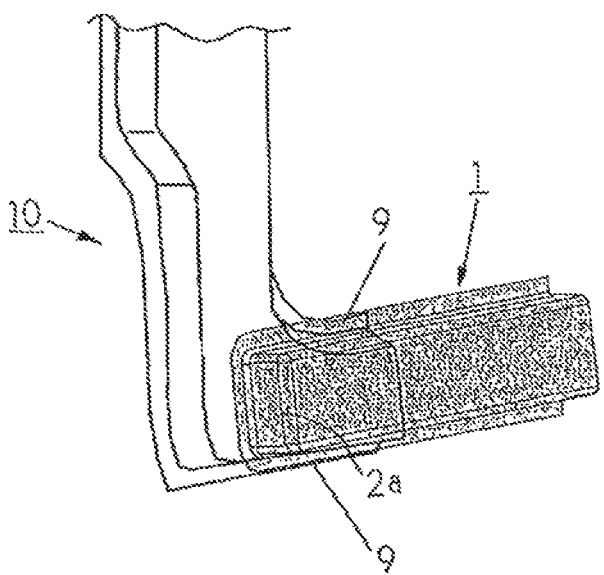
FIG. 3C is an explanatory view showing a second example of the embodiment in which the side sill is joined to the lower A pillar panel.

FIGS. 3A to 3C are explanatory views schematically showing a case where the drawn body 1 is used as a side sill.

FIG. 3A is an explanatory view showing a state before the drawn body 1 as a side sill is joined to a lower A pillar panel 10.

FIGS. 3B and 3C are explanatory views showing a first example and a second example of an embodiment in which the drawn body 1 as the side sill is joined to the lower A pillar panel 10.

As shown in FIG. 3A, the drawn body 1 as the side sill has a U-shaped cross-sectional shape by being constituted by the end wall 6, the corner walls 7, the concave ridge portion 8, and the outwardly-extending flange 9.

Therefore, as in the first example shown in FIG. 3B, the endmost portion 2a in the longitudinal direction of the drawn body 1 as the side sill is attached to an inner surface 10a of the lower A pillar panel 10, and the endmost portion 2a and the inner surface 10a are welded to each other, whereby the rigidity of the joint between the drawn body 1 as the side sill and the lower A pillar panel 10 can be increased, and the bending rigidity or torsional rigidity of an engine compartment can be increased via the lower A pillar panel 10 or a dash panel.

Furthermore, as in the first example shown in FIG. 3B, the endmost portion 2a in the longitudinal direction of the drawn body 1 as the side sill may also be disposed so as to be separated from the inner surface 10a of the lower A pillar panel 10 without being attached thereto. For example, as in the second example shown in FIG. 3C, the outwardly-extending flange 9 is caused to overlap an outwardly-extending flange 10b of the lower A pillar panel 10 and is welded thereto, whereby the rigidity of the joint between the drawn body 1 as the side sill and the lower A pillar panel 10 can be increased, and the bending rigidity or torsional rigidity of an engine compartment can be increased via the lower A pillar panel 10 or a dash panel.

(2. Manufacturing Apparatus for Drawn Body for Vehicle Structural Member According to Embodiment of Present Invention)

The manufacturing apparatus according to the embodiment is an apparatus for manufacturing a drawn body 1 and includes a first die, a first punch, a first blank holder, a second die, a second punch, a second blank holder, and a tightening tool.

(2-1. First Die, First Punch, and First Blank Holder)

Figure 4:
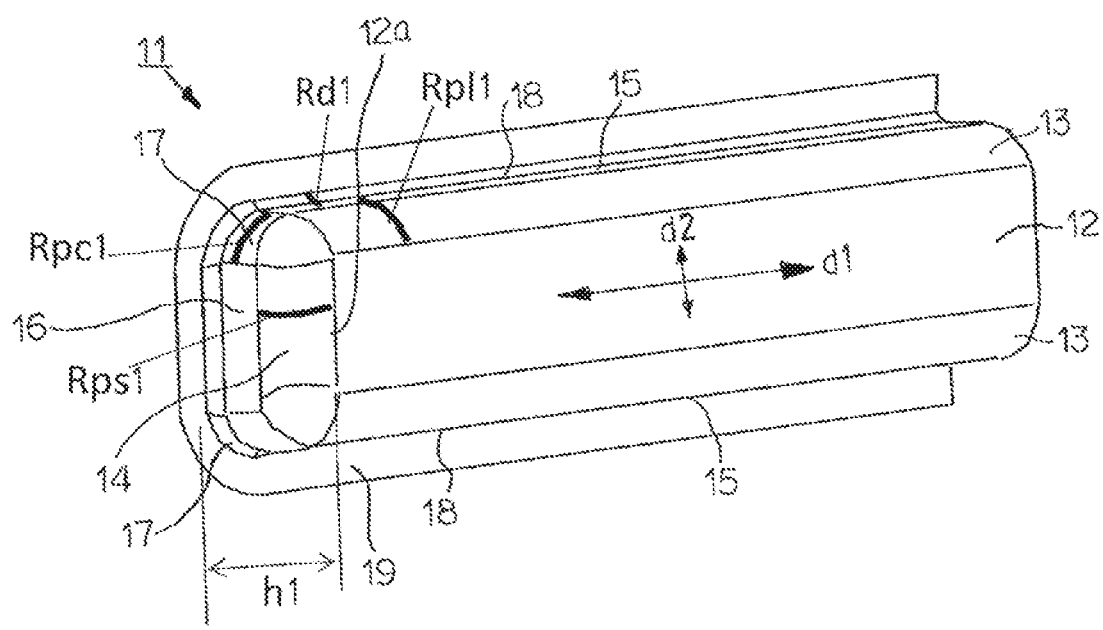
FIG. 4 is an explanatory view showing a first intermediate drawn body formed by a first die, a first punch, and a first blank holder.

FIG. 4 is an explanatory view showing a first intermediate drawn body 11 formed by a first forming die provided with a first die, a first punch, and a first blank holder. FIG. 4 shows the shape of the first intermediate drawn body 11 up to the middle in the first direction d1, and the shape of the remainder is omitted.

Using the first die, the first punch, and the first blank holder, a blank having a tensile strength of 980 MPa or more or a preform thereof is subjected to press working by drawing, thereby manufacturing the first intermediate drawn body 11.

As shown in FIG. 4, the first intermediate drawn body 11 is constituted by an intermediate top sheet portion 12, two intermediate first convex ridge portions 13, an intermediate second convex ridge portion 14, two intermediate side walls 15, an intermediate end wall 16, two intermediate corner walls 17, an intermediate concave ridge portion 18, and an intermediate outwardly-extending flange 19.

The intermediate top sheet portion 12 has a substantially planar shape and extends in a first direction d1 indicated by a double-headed arrow in FIG. 4. The two intermediate first convex ridge portions 13 and 13 are formed continuously on both sides respectively in a second direction d2 (a direction indicated by a double-headed arrow in FIG. 4, and a direction perpendicular to the first direction d1 and along the intermediate top sheet portion 12) which is a width direction of the intermediate top sheet portion 12.

The intermediate second convex ridge portion 14 is adjacent to an endmost portion 12a of the intermediate top sheet portion 12 in the first direction d1 and is formed connected to the two intermediate first convex ridge portions 13 and 13. The two intermediate side walls 15 and 15 are formed adjacent to the two intermediate first convex ridge portions 13 and 13, respectively. The intermediate end wall 16 is formed adjacent to the intermediate second convex ridge portion 14.

The two intermediate corner walls 17 and 17 are formed adjacent to the two intermediate side walls 15 and 15, respectively, and to the intermediate end wall 16, and curved in a plan view (that is, when viewed in a direction perpendicular to the first direction d1 and the second direction d2). In addition, the two intermediate corner walls 17 and 17 are respectively adjacent to the boundary regions between the intermediate first convex ridge portions 13 and the intermediate second convex ridge portion 14. The intermediate concave ridge portion 18 is formed adjacent to the two intermediate side walls 15 and 15, the intermediate end wall 16, and the two intermediate corner walls 17 and 17. Furthermore, the intermediate outwardly-extending flange 19 is formed adjacent to the intermediate concave ridge portion 18.

In the first intermediate drawn body 11, a radius of curvature Rpl1 of a cross section perpendicular to the extension direction of each of the two intermediate first convex ridge portions 13 and 13, a radius of curvature Rps1 of a cross section perpendicular to the extension direction of the intermediate second convex ridge portion 14, a radius of curvature Rd1 of a cross section perpendicular to the extension direction of the intermediate concave ridge portion 18 are respectively greater than the radius of curvature Rpl2 of the cross section perpendicular to the extension direction of each of the two first convex ridge portions 3 and 3, the radius of curvature Rps2 of the cross section perpendicular to the extension direction of the second convex ridge portion 4, and the radius of curvature Rd2 of the cross section perpendicular to the extension direction of the concave ridge portion 8 of the drawn body 1.

It is preferable that the radius of curvature Rpl1, the radius of curvature Rps1, and the radius of curvature Rd1 of the first intermediate drawn body 11 are respectively 1.2 to 30 times the radii of curvature Rpl2, the radius of curvature Rps2, and the radius of curvature Rd2 of the drawn body 1 in order to perform forming without causing cracks or wrinkles in a first step and a second step.

An intermediate corner radius Rpc1, which is the radius of curvature of the intermediate corner walls 17 and 17 viewed in a direction perpendicular to the first direction d1 and the second direction d2, at a position spaced by 1.0 mm from the boundary between the intermediate outwardly-extending flange 19 and the intermediate concave ridge portion 18 along the intermediate corner walls 17 and 17 is greater than the corner radius Rpc2 of the drawn body 1. It is preferable that the intermediate corner radius Rpc1 is 1.2 to 30 times the corner radius Rpc2 in order to perform forming without causing cracks or wrinkles in the first step and the second step. It is more preferable that the intermediate corner radius Rpc1 is 1.7 to 2.5 times the corner radius Rpc2.

Furthermore, an intermediate forming depth h1, which is the separation distance between the intermediate top sheet portion 12 and the intermediate outwardly-extending flange 19 in a direction perpendicular to the intermediate top sheet portion 12, is greater than the forming depth h2 of the drawn body 1. It is preferable that the intermediate forming depth h1 is 1.1 to 2.0 times the forming depth h2 in order to perform forming without causing cracks or wrinkles in a second step.

It is more preferable that the intermediate forming depth h1 is 1.2 to 1.5 times the forming depth h2.

(2-2. Second Die, Second Punch, and Second Blank Holder)

Figure 5A:
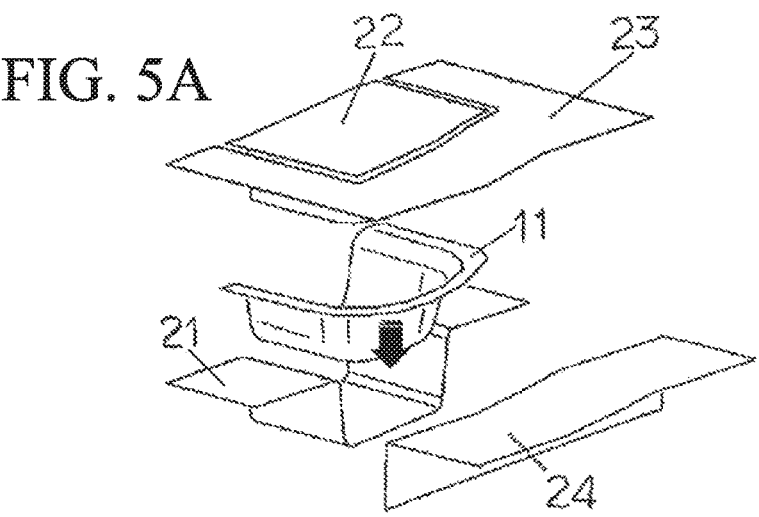
FIG. 5A is an explanatory view showing a first stage until a drawn body is manufactured from the first intermediate drawn body through a second intermediate drawn body.
Figure 5A:
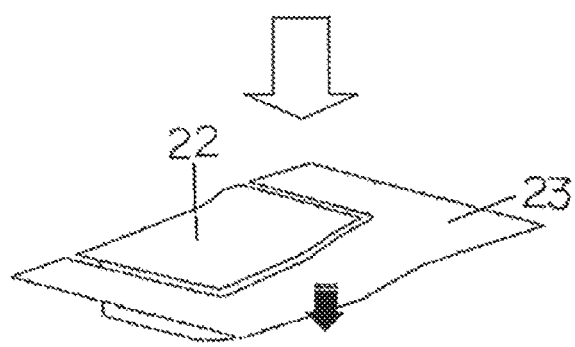
Figure 5A:
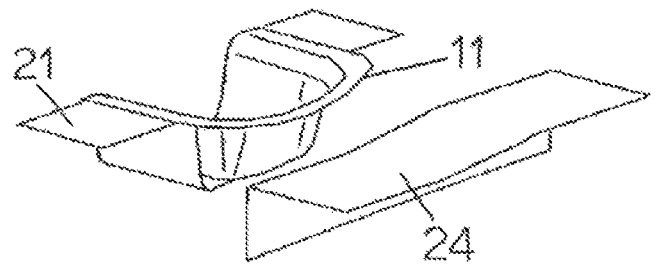
Figure 5A:
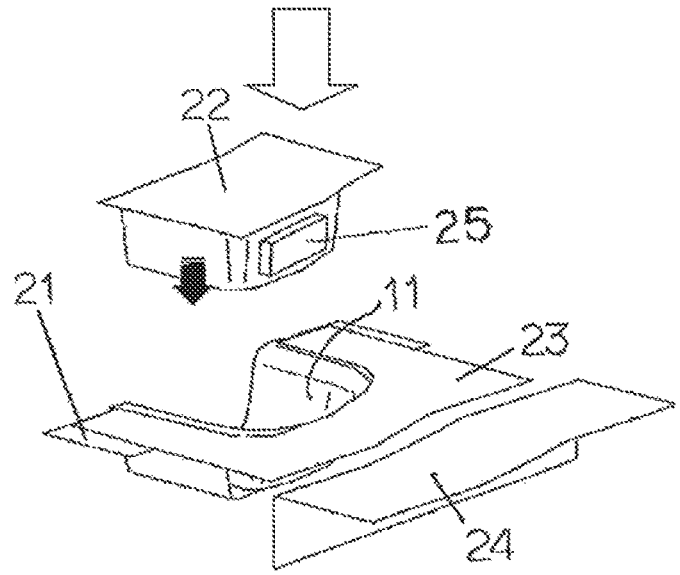
Figure 5B:
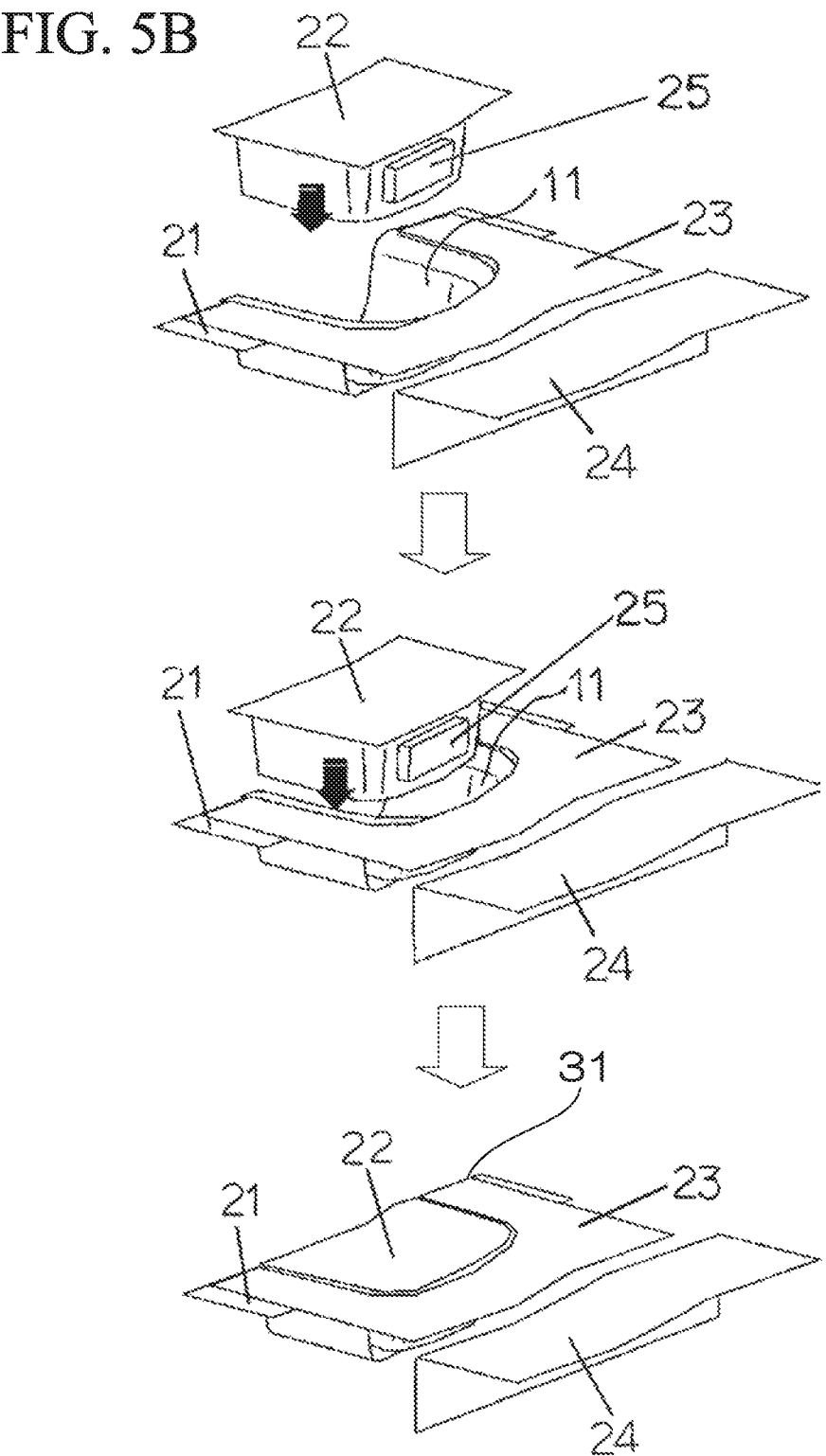
FIG. 5B is an explanatory view showing a second stage until the drawn body is manufactured from the first intermediate drawn body through the second intermediate drawn body.
Figure 5C:
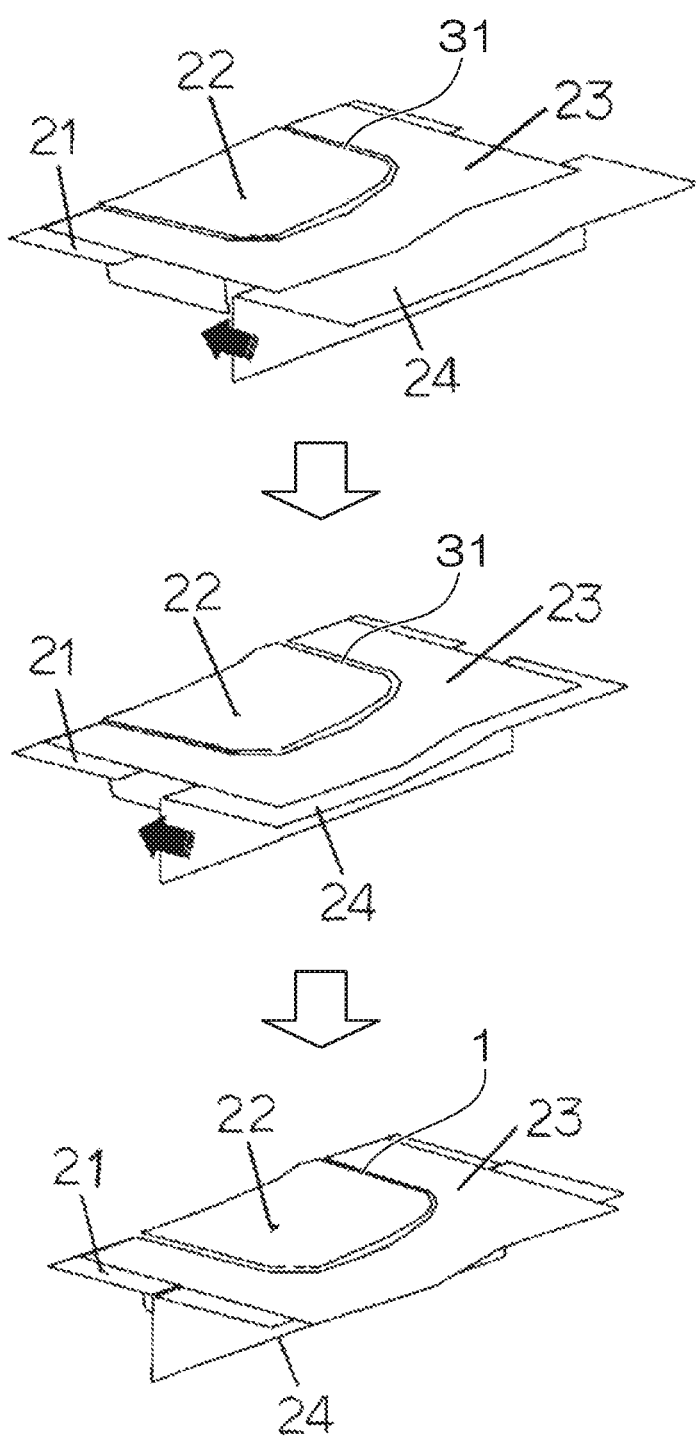
FIG. 5C is an explanatory view showing a third stage until the drawn body is manufactured from the first intermediate drawn body through the second intermediate drawn body.

FIGS. 5A to 5C are explanatory views showing first to third stages until a drawn body is manufactured from a first intermediate drawn body through a second intermediate drawn body using a second forming die provided with a second die 21, a second punch 22, and a second blank holder 23 and a cam 24. For ease of viewing the drawings, FIGS. 5A to 5C show working surfaces of the second die 21, the second punch 22, the second blank holder 23, and the cam 24.

As shown in FIGS. 5A and 5B, the second die 21 accommodates the first intermediate drawn body 11 therein. The second blank holder 23 presses the outer edge portion of the first intermediate drawn body 11. Furthermore, the second punch 22 is moved relative to the second die 21 in a clamping direction, whereby the first intermediate drawn body 11 is subjected to press working by drawing.

Accordingly, it is possible to reduce the radius of curvature Rpl1, the radius of curvature Rd1, and the forming depth h1 of the first intermediate formed body 11 shown in FIG. 4, and a second intermediate formed body 31 having a radius of curvature Rpl2, a radius of curvature Rd2, and a forming depth h2 equal to those of the drawn body 1 is manufactured.

(2-3. Tightening Tool)

In the following description, a case where the cam 24 is used as the tightening tool is exemplified. However, the tightening tool is not limited to the cam 24 and a tool capable of reducing the intermediate corner radius Rpc1 by pressing the intermediate end wall 16 of the second intermediate drawn body 31 in the first direction d1 can be equally used.

In the case of using the cam 24 as the tightening tool, the cam 24 is operated by converting the movement of a slide of a press machine, which has the second punch 22, the second blank holder 23, and depending on the case, the second die 21 attached thereto and moves vertically, into a horizontal movement via a mechanical mechanism.

In a case of using a tightening tool other than the cam, a plate which is operated independently from the slide of the press machine and is attached to a hydraulic device or an electric device may be used.

Next, as shown in FIG. 5C, the cam 24 presses the intermediate end wall 16 of the second intermediate drawn body 31 in the first direction d1 in a state in which the second intermediate drawn body 31 is confined by the second die 21, the second punch 22, and the second blank holder 23 to reduce the intermediate corner radius Rpc1 and the radius of curvature Rps1 to the corner radius Rpc2 and the radius of curvature Rps2 of the drawn body 1.

At this time, by embedding an inner pad 25 which moves in a direction different from the pressing direction in the second punch 22, the inner surface of the intermediate end wall 16 of the second intermediate drawn body 31 is pressed to suppress wrinkles generated in the intermediate end wall 16.

Figure 6:
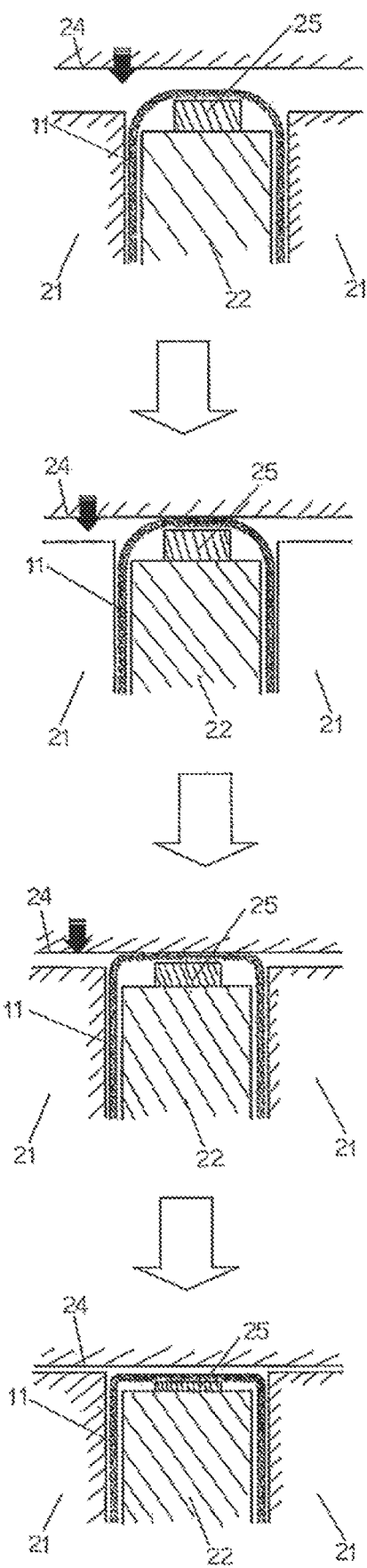
FIG. 6 is a top sectional view showing a forming situation of a case where a cam is disposed outside a second die over time.

FIG. 6 is a top sectional view showing a forming situation of a case where the cam 24 is disposed outside the second die 21 over time.

Figure 7:
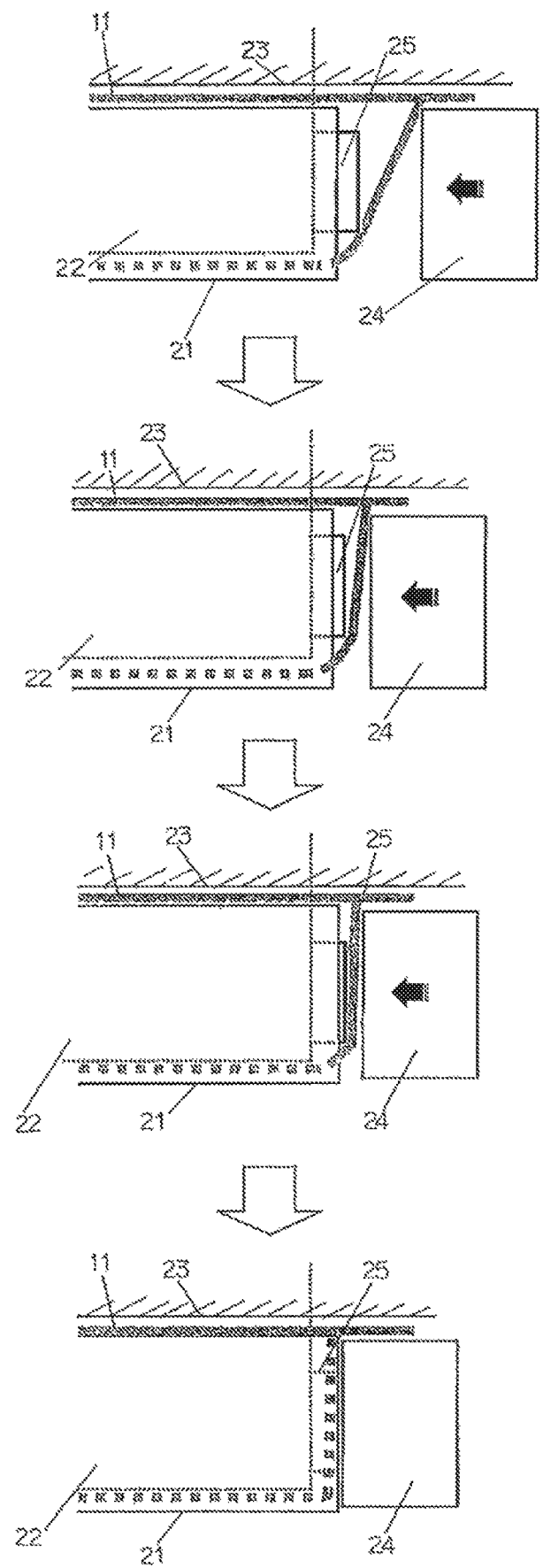
FIG. 7 is a side sectional view showing the forming situation of the case where the cam is disposed outside the second die over time.

FIG. 7 is a side sectional view showing the forming situation of the case where the cam 24 is disposed outside the second die 21 over time.

Figure 8:
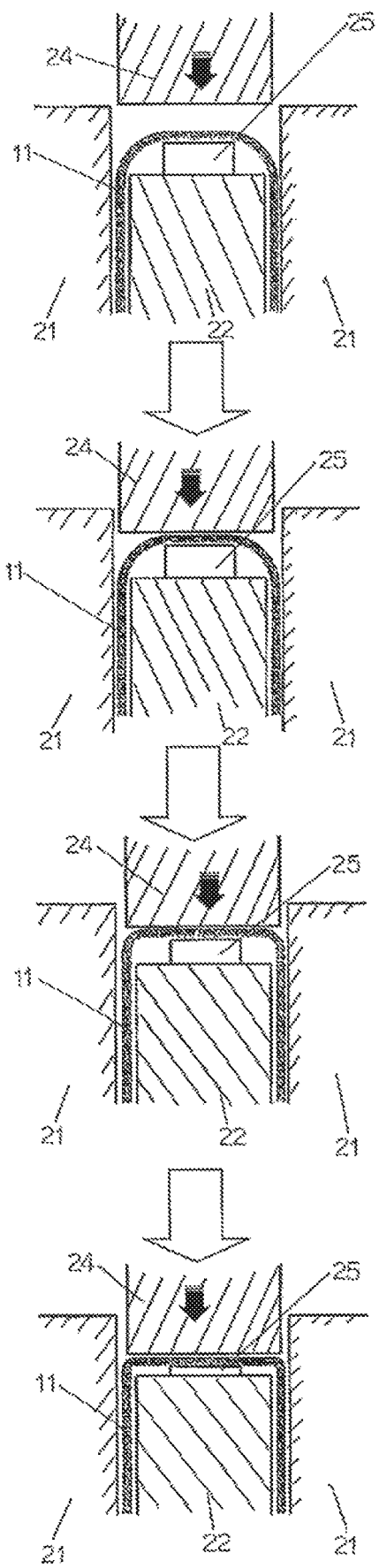
FIG. 8 is an explanatory view showing the forming situation of the case where the cam is disposed inside the second die over time.

FIG. 8 is an explanatory view showing the forming situation of the case where the cam 24 is disposed inside the second die 21 over time.

As shown in FIGS. 6 and 7, the cam (tightening tool) may be disposed so as to be movable in the first direction d1 outside the second die 21, or as shown in FIG. 8, may be disposed so as to be movable in the first direction d1 from outside to inside of the second die.

(3. Manufacturing Method for Drawn Body for Vehicle Structural Member According to Embodiment of Present Invention)

In a manufacturing method according to the embodiment, the drawn body 1 is manufactured through the following first to third steps.

First step: A blank having a tensile strength of 980 MPa or more is subjected to press working by drawing using the first die, the first punch, and the first holder, whereby the first intermediate drawn body 11 shown in FIG. 4 is formed.

Second step: As shown in FIGS. 5A and 5B, the first intermediate drawn body 11 is subjected to press forming using the second die 21, the second punch 22, and the second blank holder 23, whereby the second intermediate drawn body 31 is manufactured.

Third step: As shown in FIG. 5C, in a state in which the second intermediate drawn body 31 is confined by the second die 21, the second punch 22, and the second blank holder 23, the intermediate end wall 16 of the second intermediate drawn body 31 is pressed by the cam 24 in the first direction d1 to reduce the intermediate corner radius Rpc1 and the radius of curvature Rps1 to the corner radius Rpc2 and the radius of curvature Rps2 of the drawn body 1.

After the third step, as necessary, a pressing portion of the drawn body 1 pressed by the second blank holder 23 may be cut off.

EXAMPLES

Press-formed bodies 40 to 46 shown in FIGS. 9A to 9G are formed using a 1180 MPa-class high tensile strength steel sheet having a thickness of 1.0 mm.

Figure 9A:
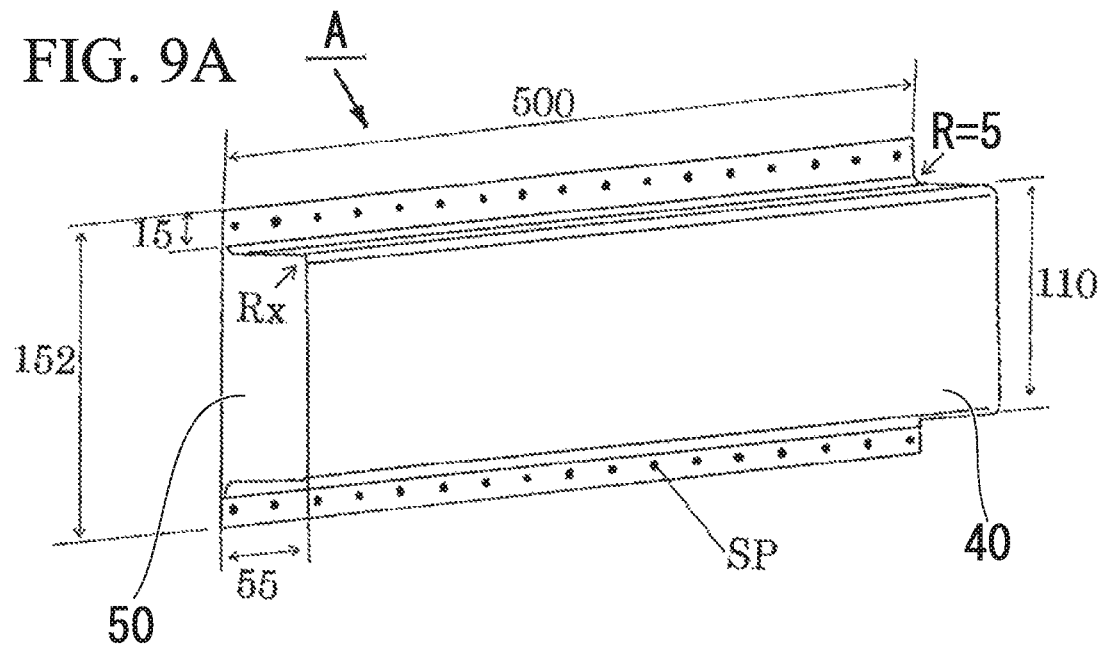
FIG. 9A is an explanatory view showing a test body A used as an example.

The press-formed body 40 shown in FIG. 9A is a formed body manufactured by a bending forming method in the related art, and has a structure with no end wall.

The press-formed bodies 41 to 46 shown in FIGS. 9B to 9G are formed bodies manufactured by the drawing method shown in FIGS. 5A to 5C, and have a structure having an end wall at one end portion.

In the press-formed body 40 shown in FIG. 9A, a radius of curvature Rx of a convex ridge portion was set to 5 mm.

In the press-formed bodies 41 to 46 shown in FIGS. 9B to 9G, radii of curvature Rx of convex ridge portions were set to 5 mm, 10 mm, 20 mm, 30 mm, 40 mm, and 50 mm, respectively.

As shown in FIGS. 9A to 9G, test bodies A to G were prepared by attaching a high tensile strength steel sheet having a sheet thickness of 1.0 mm and a tensile strength of 1180 MPa class as a back sheet 50 (closing sheet) to a flange of each of the press-formed bodies 40 to 46 by resistance spot welding. Points indicated by black circles in FIGS. 9A to 9G are spot-welding portions, the weld pitch is 30 mm, and the weld diameter of 3.3 mm.

Figure 10:
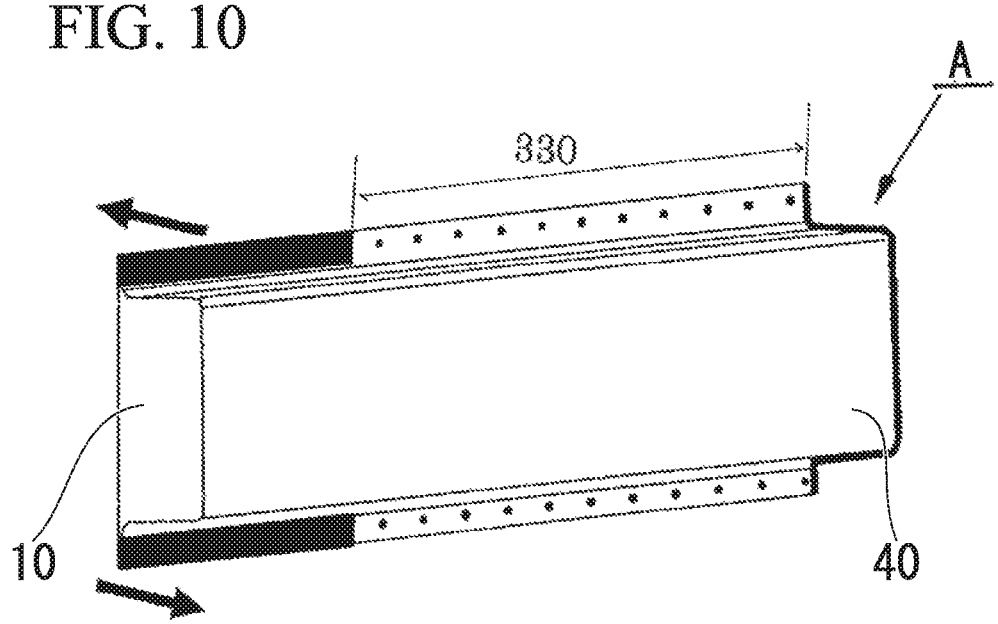
FIG. 10 is an explanatory view showing measurement conditions of torsional rigidity of the test body A.

FIG. 10 is an explanatory view showing measurement conditions of the torsional rigidity of the test body A, and the unit of dimension is mm.

As shown in FIG. 10, one end portion of the test body A was completely confined together with the back sheet 50, the colored region in FIG. 10 was displaced in the directions of the arrows to apply torsional displacement to the vehicle structural member, and the torsional rigidity was examined.

Figure 11:
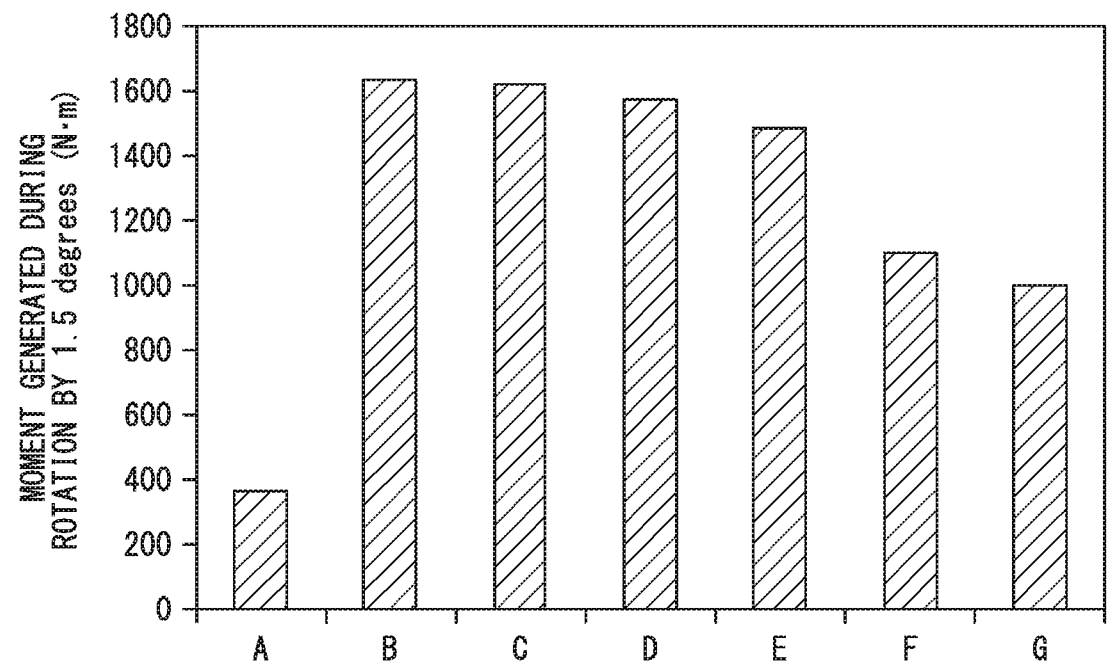
FIG. 11 is a graph showing evaluation results of the torsional rigidities of the test bodies A to G.

The torsional rigidities of the test bodies B to G were examined in the same manner, and the moment generated during each rotation by 1.5 degrees is plotted in the graph of FIG. 11.

As shown in the graph of FIG. 11, it can be seen that the torsional rigidities of the test bodies B to G having a U-shaped cross-sectional shape are significantly higher than the torsional rigidity of the test body A having a hat-shaped open cross-sectional shape, while the torsional rigidity decreases when the radius of curvature Rx of the convex ridge portion exceeds 30 mm as in the test bodies F and G.

Furthermore, bending rigidity measurement was performed using the test bodies A to G prepared as described above.

Figure 12:
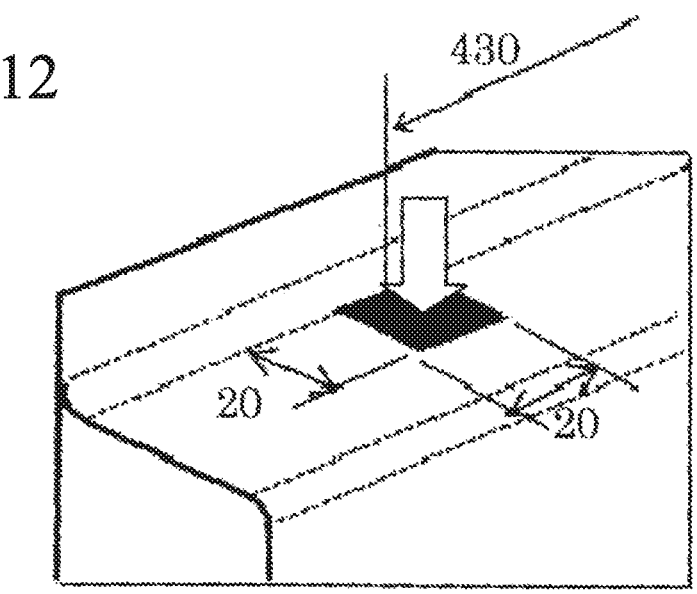
FIG. 12 is an explanatory view showing measurement conditions of bending rigidity of the test body A.

FIG. 12 is an explanatory view showing measurement conditions of the bending rigidity of the test body A, and the unit of dimension is mm.

As shown in FIG. 12, in the test body A, the bending rigidity was examined by applying displacement to a position indicated by the arrow in the colored region of FIG. 12.

Figure 13:
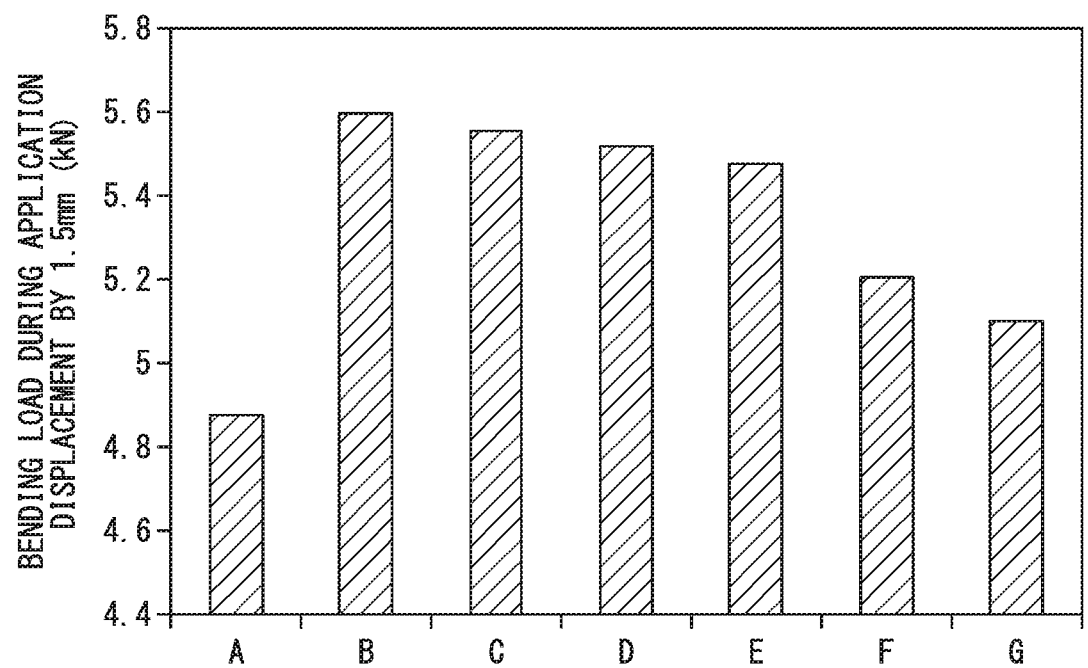
FIG. 13 is a graph showing evaluation results of the bending rigidities of the test bodies A to G.

The bending rigidities of the test bodies B to G were also examined in the same manner, and the bending load during the application of each displacement by 1.5 mm is plotted in the graph of FIG. 13.

As shown in the graph of FIG. 13, it can be seen that the bending rigidities of the test bodies B to G having a U-shaped cross-sectional shape are significantly higher than the bending rigidity of the test body A having a hat-shaped open cross-sectional shape, while the bending rigidity decreases when the radius of curvature Rx of the convex ridge portion exceeds 30 mm as in the test bodies F and G.

Figure 9B:
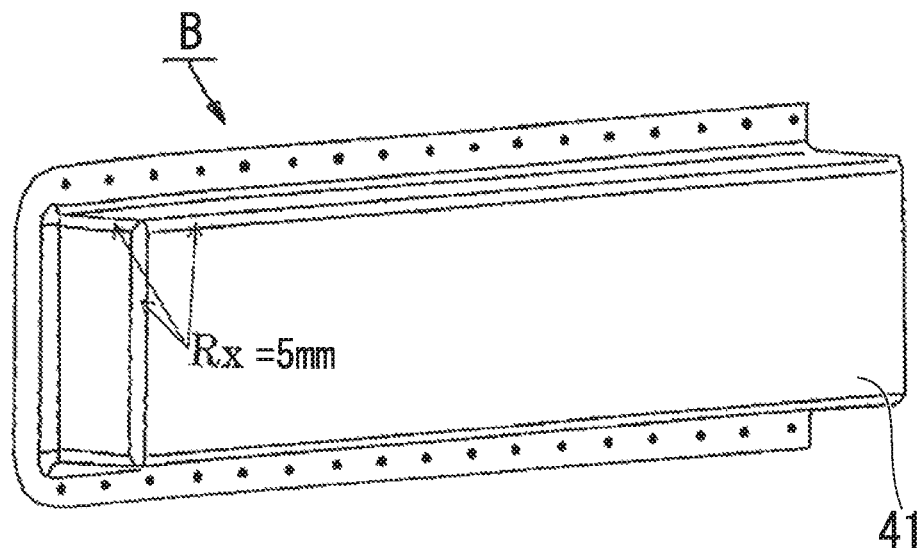
FIG. 9B is an explanatory view showing a test body B used as an example.
Figure 9C:
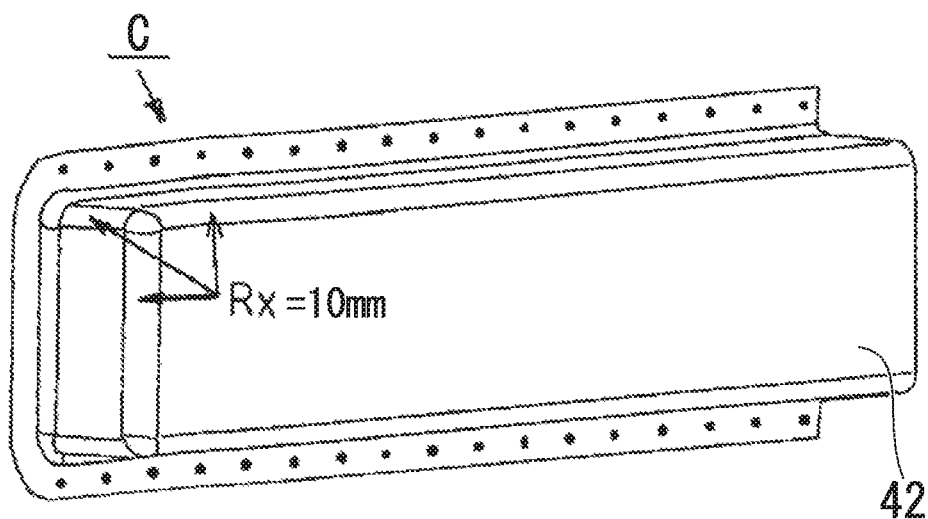
FIG. 9C is an explanatory view showing a test body C used as an example.
Figure 9D:
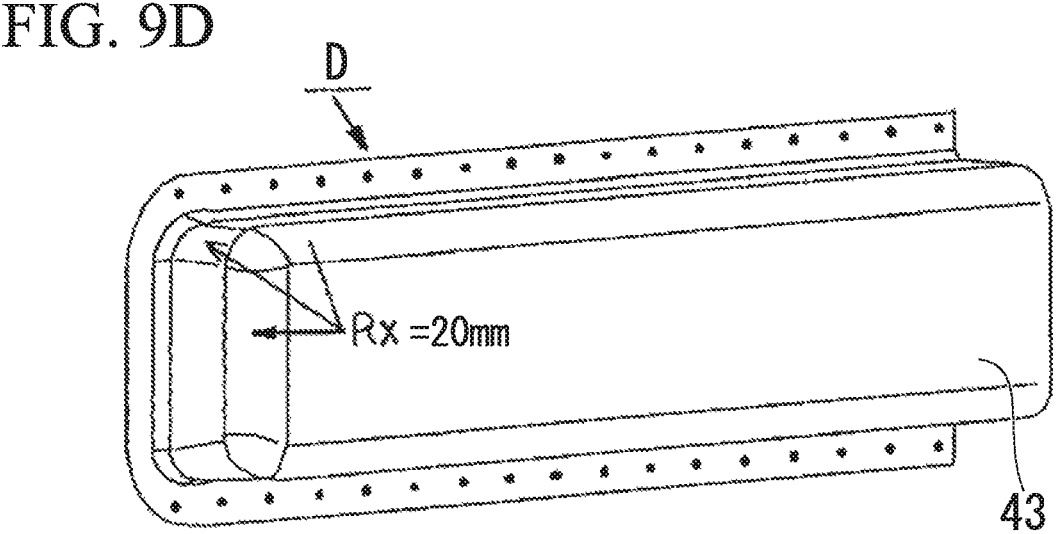
FIG. 9D is an explanatory view showing a test body D used as an example.
Figure 9E:
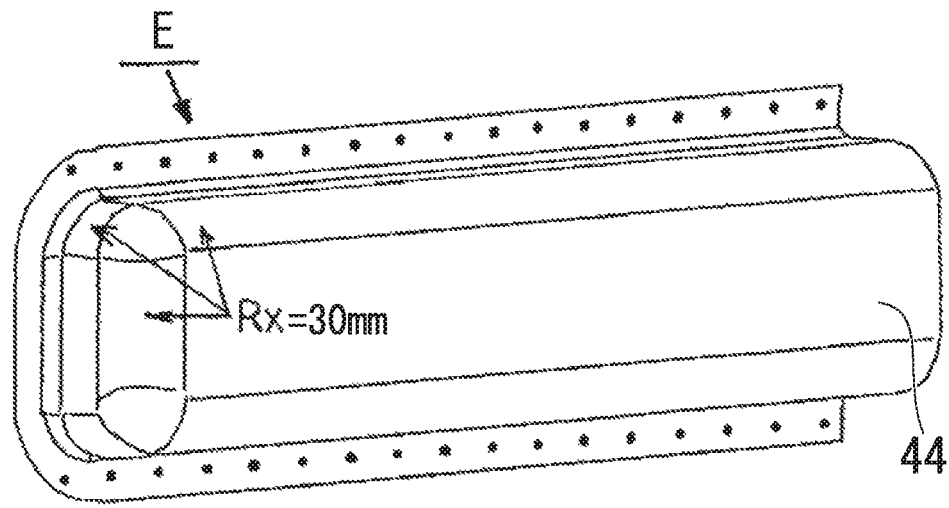
FIG. 9E is an explanatory view showing a test body E used as an example.
Figure 9F:
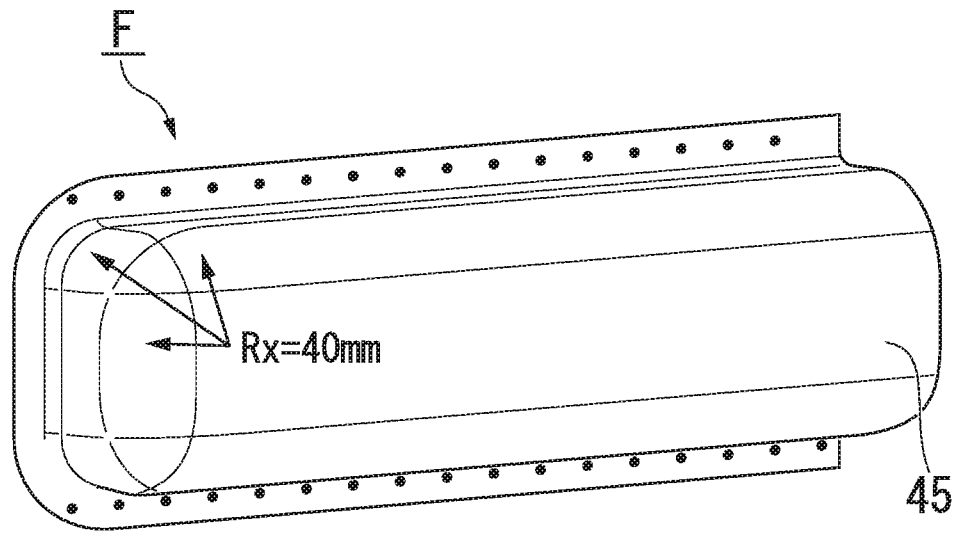
FIG. 9F is an explanatory view showing a test body F used as an example.
Figure 9G:
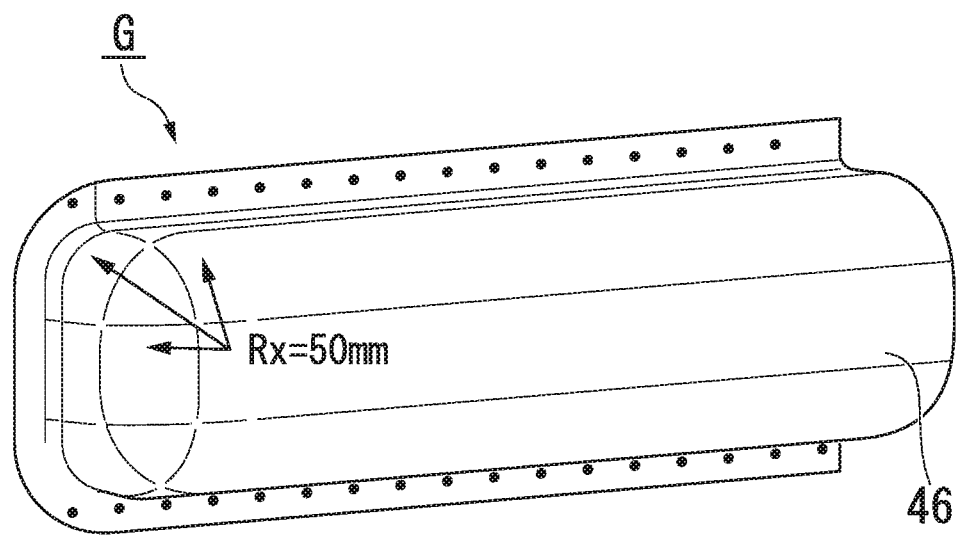
FIG. 9G is an explanatory view showing a test body G used as an example.

As a comparative example, a press-formed body having the same dimensions as the press-formed body 41 shown in FIG. 9B was prepared by performing drawing without operating the inner pad 25 shown in FIGS. 5A to 5C, and noticeable wrinkles were generated in an end wall. A test body was prepared from the press-formed body in the same manner and the torsional rigidity and bending rigidity were measured as described above. The moment generated during rotation by 1.5 degrees was 600 N·m, the bending load during the application of a displacement of 1.5 mm was 5.1 kN, and it was confirmed that high torsional rigidity and bending rigidity could not be exhibited.

INDUSTRIAL APPLICABILITY

According to the present invention, it is possible to provide a drawn body for a vehicle structural member, a manufacturing method for a drawn body for a vehicle structural member, and a manufacturing apparatus for a drawn body for a vehicle structural member capable of increasing collision resistance by achieving high rigidity while realizing a reduction in weight.

BRIEF DESCRIPTION OF THE REFERENCE SYMBOLS

1: drawn body for vehicle structural member
2: top sheet portion
3: first convex ridge portion
4: second convex ridge portion
5: side wall
6: end wall
7: corner wall
8: concave ridge portion
9: outwardly-extending flange

What is claimed is:
1. A drawn body for a vehicle structural member, the drawn body having a tensile strength of 980 MPa or more, the drawn body comprising:

a top sheet portion extending in a first direction;
two first convex ridge portions adjacent to both sides of the top sheet portion in a second direction which is perpendicular to the first direction and along the top sheet portion;
a second convex ridge portion which is adjacent to an endmost portion of the top sheet portion in the first direction and is connected to the two first convex ridge portions;
two side walls adjacent to the two first convex ridge portions;
an end wall adjacent to the second convex ridge portion;
two corner walls which are adjacent to the two side walls and the end wall and have a curved shape as viewed in a direction perpendicular to the first direction and the second direction;
a concave ridge portion adjacent to the two side walls, the end wall, and the two corner walls; and
an outwardly-extending flange adjacent to the concave ridge portion,
wherein a radius of curvature of a cross section perpendicular to an extension direction of each of the two first convex ridge portions, the second convex ridge portion, and the concave ridge portion is 30 mm or less,
a corner radius which is a radius of curvature of the corner wall viewed in the direction perpendicular to the first direction and the second direction at a position spaced by 1.0 mm from a boundary between the outwardly-extending flange and the concave ridge portion along the corner wall is 30 mm or less, and
a forming depth which is a separation distance between the top sheet portion and the outwardly-extending flange in a direction perpendicular to the top sheet portion is 40 mm or more.

2. The drawn body for a vehicle structural member according to claim 1,
wherein the end wall, the two corner walls, the concave ridge portion, and the outwardly-extending flange are formed at both ends in the first direction.

3. The drawn body for a vehicle structural member according to claim 1,
wherein the drawn body is any one of the group consisting of a side sill, a bumper beam, a lower A pillar panel, an A pillar, and a B pillar.

4. A manufacturing method for the drawn body for a vehicle structural member according to claim 1, the manufacturing method comprising:
a first step of performing press working on a blank having a tensile strength of 980 MPa or more by drawing using a first die, a first punch, and a first blank holder, thereby forming a first intermediate drawn body which includes an intermediate top sheet portion extending in the first direction, two intermediate first convex ridge portions adjacent to both sides of the intermediate top sheet portion in the second direction perpendicular to the first direction, an intermediate second convex ridge portion which is adjacent to an endmost portion of the intermediate top sheet portion in the first direction and is connected to the two intermediate first convex ridge portions, two intermediate side walls connected to the two intermediate first convex ridge portions, an intermediate end wall adjacent to the intermediate second convex ridge portion, two intermediate corner walls which are adjacent to the two intermediate side walls and the intermediate end wall and have a curved shape as viewed in the direction perpendicular to the first direction and the second direction, an intermediate concave ridge portion adjacent to the two intermediate side walls, the intermediate end wall, and the two intermediate corner walls, and an intermediate outwardly-extending flange adjacent to the intermediate concave ridge portion, in which a radius of curvature of a cross section perpendicular to an extension direction of each of the two intermediate first convex ridge portions, the intermediate second convex ridge portion, and the intermediate concave ridge portion is greater than the radius of curvature of the cross section perpendicular to the extension direction of each of the two first convex ridge portions, the second convex ridge portion, and the concave ridge portion of the drawn body, an intermediate corner radius, which is a radius of curvature of the intermediate corner wall viewed in the direction perpendicular to the first direction and the second direction at a position spaced by 1.0 mm from a boundary between the intermediate outwardly-extending flange and the intermediate concave ridge portion along the intermediate corner wall, is greater than the corner radius of the corner wall of the drawn body, and an intermediate forming depth, which is a separation distance between the intermediate top sheet portion and the intermediate outwardly-extending flange in a direction perpendicular to the intermediate top sheet portion, is greater than the forming depth of the drawn body;
a second step of performing press working on the first intermediate drawn body by drawing using a second die, a second punch, and a second blank holder to reduce the radius of curvature of the cross section perpendicular to the extension direction of each of the two intermediate first convex ridge portion, the intermediate second convex ridge portion, and the intermediate concave ridge portion and the intermediate forming depth, thereby forming a second intermediate drawn body which has the radius of curvature of the cross section perpendicular to the extension direction of each of the two first convex ridge portions, the second convex ridge portion, and the concave ridge portion of the drawn body and the forming depth; and
a third step of pressing the intermediate end wall of the second intermediate drawn body in the first direction by a tightening tool while pressing an inner surface of the intermediate end wall of the first intermediate drawn body by an inner pad embedded in the second punch in a state in which the second intermediate drawn body is confined by the second die, the second punch, and the second blank holder, thereby reducing the intermediate corner radius of the intermediate corner wall.

5. The manufacturing method for the drawn body for a vehicle structural member according to claim 4,
wherein the intermediate forming depth is 1.1 to 2.0 times the forming depth,
the radii of curvature of the two intermediate first convex ridge portion, the intermediate second convex ridge portion, and the intermediate concave ridge portion are 1.2 to 30 times the radii of curvature of the two first convex ridge portions, the second convex ridge portion, and the concave ridge portion, respectively, and
the intermediate corner radius is 1.2 to 30 times the corner radius.

6. The manufacturing method for the drawn body for a vehicle structural member according to claim 4,
wherein the tightening tool is disposed so as to be movable in the first direction on the outside of the second die.

7. The manufacturing method for the drawn body for a vehicle structural member according to claim 4,
wherein the tightening tool is disposed so as to be movable in the first direction from the outside to the inside of the second die.

8. A manufacturing apparatus for the drawn body for a vehicle structural member according to claim 1, the manufacturing apparatus comprising:
a first forming die having a first die, a first punch, and a first blank holder;
a second forming die having a second die, a second punch, and a second blank holder; and
a tightening tool,
wherein the first forming die performs press working on a blank having a tensile strength of 980 MPa or more by drawing, thereby forming a first intermediate drawn body which includes an intermediate top sheet portion extending in the first direction, two intermediate first convex ridge portions adjacent to both sides of the intermediate top sheet portion in the second direction perpendicular to the first direction, an intermediate second convex ridge portion which is adjacent to an endmost portion of the intermediate top sheet portion in the first direction and is connected to the two intermediate first convex ridge portions, two intermediate side walls connected to the two intermediate first convex ridge portions, an intermediate end wall adjacent to the intermediate second convex ridge portion, two intermediate corner walls which are adjacent to the two intermediate side walls and the intermediate end wall and have a curved shape as viewed in the direction perpendicular to the first direction and the second direction, an intermediate concave ridge portion adjacent to the two intermediate side walls, the intermediate end wall, and the two intermediate corner walls, and an intermediate outwardly-extending flange adjacent to the intermediate concave ridge portion, in which a radius of curvature of a cross section perpendicular to an extension direction of each of the two intermediate first convex ridge portions, the intermediate second convex ridge portion, and the intermediate concave ridge portion is greater than the radius of curvature of the cross section perpendicular to the extension direction of each of the two first convex ridge portions, the second convex ridge portion, and the concave ridge portion of the drawn body, an intermediate corner radius, which is a radius of curvature of the intermediate corner wall viewed in the direction perpendicular to the first direction and the second direction at a position spaced by 1.0 mm from a boundary between the intermediate outwardly-extending flange and the intermediate concave ridge portion along the intermediate corner wall, is greater than the corner radius of the corner wall of the drawn body, and an intermediate forming depth, which is a separation distance between the intermediate top sheet portion and the intermediate outwardly-extending flange in a direction perpendicular to the intermediate top sheet portion, is greater than the forming depth of the drawn body,
the second forming die performs press forming on the first intermediate drawn body by drawing to reduce the radius of curvature of the cross section perpendicular to the extension direction of each of the two intermediate first convex ridge portion, the intermediate second convex ridge portion, and the intermediate concave ridge portion and the intermediate forming depth, thereby forming a second intermediate drawn body which has the radius of curvature of the cross section perpendicular to the extension direction of each of the two first convex ridge portions, the second convex ridge portion, and the concave ridge portion of the drawn body and the forming depth, and
the tightening tool presses the intermediate end wall of the second intermediate drawn body in the first direction while pressing an inner surface of the intermediate end wall of the first intermediate drawn body by an inner pad embedded in the second punch in a state in which the second intermediate drawn body is confined by the second forming die, thereby reducing the intermediate corner radius of the intermediate corner wall.

9. The manufacturing apparatus for the drawn body for a vehicle structural member according to claim 8,
wherein the intermediate forming depth is 1.1 to 2.0 times the forming depth,
the radii of curvature of the two intermediate first convex ridge portion, the intermediate second convex ridge portion, and the intermediate concave ridge portion are 1.2 to 30 times the radii of curvature of the two first convex ridge portions, the second convex ridge portion, and the concave ridge portion, respectively, and
the intermediate corner radius is 1.2 to 30 times the corner radius.

10. The manufacturing apparatus for the drawn body for a vehicle structural member according to claim 8,
wherein the tightening tool is disposed so as to be movable in the first direction on the outside of the second die.

11. The manufacturing apparatus for the drawn body for a vehicle structural member according to claim 8,
wherein the tightening tool is disposed so as to be movable in the first direction from the outside to the inside of the second die.

12. The drawn body for a vehicle structural member according to claim 1,
wherein the drawn body is a cold or warm drawn body formed of a high tensile strength steel sheet having a sheet thickness of 0.7 to 3.2 mm and a tensile strength of 980 MPa or more.

* * * * *